Patented Apr. 30, 1935

1,999,969

UNITED STATES PATENT OFFICE 1,999,969

SEASONING, PRESERVING, TEMPERING WOOD AND WOODY GROWTHS

George Elton Rice, New York, N. Y., assignor to Conservation Corporation of America, a corporation of Delaware No Drawing. Application April 30, 1930, Serial No. 448,786. Renewed October 3, 1934

2 Claims. (Cl. 99—12)

The present invention relates to a method of seasoning, preserving and tempering wood and woody growth, or matter of a nature of growth containing cellulose in its structure.

My invention covers the seasoning, preserving and tempering of wood and woody growths, that are described as follows:

1. A single stem, upright woody stem.
2. Acrogens, the addition being at the top (tree ferns, etc.).
3. Endogens, that increase from within, the first formed and oldest wood being outside: (palms, bamboo and the like).
4. Exogens, which grow by successive layers; on the exterior, the oldest growth being within: (Angiosperms, conifers, and some Gymnosperms or better described as Pterdophytes, Monocotyledons and Dicotyledons).
5. Any form of plant, shrub, weed, tuber, bulb, growing below the surface or above, that contains cellulose in its structure or composition.

The present invention aims to provide a novel and improved method for seasoning, preserving and tempering the wood and woody growth, in any form, as described, thereby stabilizing, strengthening, and preserving and inhibiting the wood and woody growth against attacks by wood destroyers, the method being performed in a rapid, efficient manner, without the necessity of previous seasoning, drying or other preparation.

It was discovered by the applicant after years of continuous research, that a small quantity of base material, product of a woody growth, similar in composition, to the wood itself, but free from colloidal matter, to which is added another base material, a product of a different woody growth, and to which is added a chemical, and a toxic as desired, the combination acting as a natural effective preservative, when replacing the natural "extractives", proteids and other natural content of the wood and woody growth, was sufficient to penetrate the cell walls, protoplasmic walls, sap vessels, resin canals, and through the medullary rays or pores, a more thorough and complete cleansing of the "extractives", et cetera, being accomplished by the action of the solution, plus a varied rising temperature, that will be fully described, all this being accomplished without injury to the structure, cell walls, fibres of the woody structure, no stressing in any manner or form being done.

It was also discovered, after thorough exhaustive tests, that a small quantity of a crystalline material or materials, which will be described, acts upon the nitrogeneous (proteids) matter, causing it to coagulate and carry on suspended matter. It being an astringent, fermentation cannot take place in its presence, and the solution remains sweet and free from cloud. It also enters into combination with the liquid constituents of the cells, cell walls, fibres, etc., thus producing a hardening effect and so allows more of the seasoning, preserving and tempering materials to enter the structure, cell walls, etc., and interstices. It does not corrode metals, has no effect on humans or finishes of any class, when applied in or on the surface of treated wood or woody growth.

One of the objects of my invention is to remove the natural ferments, "extractives", sap and fluids, chlorophyll, starches, sugars, bitorgens, oils, fats, acids, et cetera, rapidly, without injury to the structure of wood and woody growth.

Another object is to replace the expelled "extractives" and filling interstices with a preservative, a fixing medium, toxics, a dye or oil or combination according to requirements or specifications.

Another object is to provide a rapid method, which, by taking advantage of the organic and inorganic content of the wood, or woody growth, will aid, when used in combination with various organics and inorganics in solution, in cleansing, densifying and tempering the wood and woody growth throughout and inhibit the wood against attacks or destruction by wood destroyers.

Another object is to rapidly season, preserve and temper wood or woody growth, which is first prepared in the form of logs, and the wood or woody growth, either in the form of logs, plank, blocks, strips, veneer, plywood or shredded in any fabricated or entire form, as may be desired.

The invention also has for an object, to combine in a single operation the removal of all excess extraneous matters from the wood or woody growth, and the replacement thereof, by the preserving and protecting materials or substance.

The invention is based upon the underlying natural laws, that all colloidal substances, of which wood is the most important, absorb their similars under certain conditions, and that all colloidal substances become stable after being raised to a degree of heat, specifically peculiar to each of them, from which it results, that in carrying out my invention, the solution which is absorbed by the wood will be thoroughly assimilated by the tissues and held in combination with the fibres of the wood and in the interstices, and no matter how hard the wood is, it will be cleaned or cleansed of extraneous matters, and the live summer wood stabilized to equal the heart or fixed growth of the wood without the aid of vacuum or pressure equipment in producing the required treatment and/or pressure or vacuum or vacuum followed by pressure may be employed.

The present process contemplates the treatment of the wood and woody growth in its natural state, without previous drying, for the purpose of more readily removing the extraneous matters therefrom, such as natural moisture, sap, starches, sugars, gums, acids, oils, resin, oleoresins, tannins, albumin, et cetera, before they become coagulated, thus preventing the liability of fracturing the cell walls or fibres, and reducing season checking and degrading.

A still further object is the provision of a process of the kind indicated, utilizing a specified syrup or saccharine solution, for accomplishing the results above indicated, and a still further object, in this connection, is the use, in combination with the syrup or invert or saccharine solution, such other ingredients or ingredient, so as to hasten the drying and tempering of the treated wood or woody growth, to prevent fermentation of the preservatives or solution used, as well as facilitating the treatment of the wood or woody growth itself and obtaining other advantages.

Another object is to embody in the process, if so desired, the saturation of the treated wood with an oil, to assist in removing excess matters, and stabilizing the wood, as well as rendering same a non-conductor of electrical energy and moisture proof.

The invention is especially advantageous for the treatment of wood and woody growth, although it may be used with suitable modifications, for the treatment of silk or various vegetable fibres used commercially, such as straw, jute, hemp, bagasse and magasse, hemi-cellulose, and other fibres, tobacco, et cetera.

I have discovered that osmotic action may be increased by the use of a catalyst, thus by combining in the solution an osmosis producing substance or ingredient with a suitable catalytic agent, the osmotic action may be increased, which lessens the time required for treatment, as well as producing better, more complete results without injury to the structure of the wood.

The sugars have been found to be especially suitable for osmotic action although other carbohydrates or organic compounds may be used, and it is also possible to use various salts having osmotic pressures when in solution or other inorganic compounds.

Boron is a convenient and effective catalyst for use with the sugar solutions, preferably in the form of boric acid $B(OH)_3$, and it will be apparent that other suitable equivalents may be used, such as nickel and other metals, salts, within the spirit of the invention as set forth.

A further object is to take advantage of the active or growing periods or seasons or when the "extractives" are in a semi-fluid condition, as all wood or woody growth has a rest period or rest periods.

Advantage is taken in all cases of the chemical content and action between or with the fluid content of the wood and woody growth and the base materials employed, as a vehicle for the transmission or preserving solutions.

A typical solution, for the processing of beech, comprises water, which is substantially free from organic impurities and base materials. The water is proportioned by weight to which is added base materials, based on use and purpose of the wood. To each 100 pounds or parts of water is added, after the water is heated to 100° F., 21 pounds or parts of invert sugar of cane or beet, which indicates a content of 60% levulose and 40% dextrose by inversion; 5 pounds or parts of C. P. glycerine, 5 pounds or parts of anhydrous granulated refined dextrose; one-half pound or part of aluminum sulfate or when necessary or desired one-half pound of aluminum potassium sulfate. The aluminum sulfate and dextrose should be mixed in proportions, as stated, then mixed in solution in water before adding to base solution, the object being to get same more perfectly soluble.

The formula should show 100 pounds or parts of water, 21 pounds or parts of invert sugar, 5 pounds or parts of C. P. glycerine, 5 pounds or parts of dextrose, from corn, ½ pound aluminum sulfate and indicate a specific gravity of 1080 at 60° F.

The specific gravity is reduced by the addition of water, when desired in connection with other species of wood. In order to increase the stiffness, hardness, density or similar conditions, proportions varying from ½ part to 5 parts each of aluminum sulfate and dextrose may be added to the base materials in solution. When flexibility is desired, the proportions of glycerine are increased from 1 to 5 parts in addition to the parts in solution.

The anhydrous dextrose from corn accelerates the drying, tempering the wood without the use of artificial drying processes or mechanism. In other words the anhydrous dextrose has a tendency to throw off moisture in the wood.

In preparing the wood or woody growth for treatment, it may be treated in the form of timber, logs, poles, posts, bolts, squares, or sawed, turned, shaped, hewed, or any convenient form; veneers plywood or shredded but to be active and effective, the fibres or cellulose structure should retain its capillarity.

The wood or woody growth is preferably loaded on or in trucks, racks, frames, baskets or other convenient carriers or conveyors, and timber boards and similar products are to be separated into courses or layers and spaced so that the preserving solution may circulate or pass freely in contact with the stack or load, and when drying, after being treated, to allow free circulation of the surrounding air. The treating tank is preferably rectangular in construction. After the wood or woody growth is loaded in the treating tank, the load is immersed to not less than four inches over top of load; the solution and load is gradually heated from temperature of surrounding air, stepped up to not over 180° F., and to illustrate the time required for 4/4 beech, fresh felled, to sterilize and remove "extractives" ferments, etc., is about five hours.

When sterilization is complete, when no further indication of air, colloidal matter, etc., is leaving the wood, the heat is turned off and impregnation begins, and the cooling period indicates the desired impregnation. Cooling from 180° F. to 110° F., produces the average impregnation for furniture wood or use. The impregnation periods are varied. The volatiles, oils and other extractives may be recovered as valuable by-products. When the impregnation is completed to the desired point, the preserving solution is removed; the load is allowed to drain, then the load is removed to the location desired.

During the steps of raising of temperature, the molecular activity and action of the solution is increased and becomes more effective.

The action of the solutions, from the immersing of the wood or woody growth, is:

a. Penetration.
b. Purge or expel extraneous matters, ferments, or extractives.
c. Sterilization of wood and woody growth.
d. Normalize or nourish wood or woody growth.
e. Impregnate, as desired, for preservation softness or hardness, inhibition against wood destroyers, flame proofing, etc.
f. The filling of cavities, exposed to the cut, this being accomplished by capillarity.
g. Saturation of all cell walls and cavities of the parenchyme.
h. Saturation of the liquefied cell walls of the woody fibres.
i. The fibres are shortened, the cell walls are thickened and become more plastic.
j. The colloids, proteins, are removed, the remaining matter stabilized.
k. Osmotic pressure of dilute sugar solutions is proportional to the concentration.
l. The action of the solutions is chemical, plus stepping up temperatures and during the impregnation period, fills the cavities of the cells and ultra-microscopic spaces.
m. Imbibition of the cell walls show the great attraction for the preserving solutions.
n. Other forces to be considered during the activity of the solutions are: assimilation, cohesion, capillary phenomena, adhesion forces and motions of the molecule.

The extractives removed from wood and woody growth are quite varied in different species and are responsible for expansion and contraction, odor, dyes and color. The sugars or carbohydrates, that may be used, must indicate simple structure and low molecular composition and as free from colloids as practical, a crystalloid being preferable.

The aluminum surfate acts upon the nitrogenous matter or proteids in the woods, causing same to coagulate and carry down any suspended matter. Such aluminum sulfate being an astringent, will prevent the solution from fermenting, and the solution will remain sweet and free from clouds. The aluminum sulfate also enters into combination with the liquid constituents of the cells, cell walls and fibres of the wood, to produce a hardening effect after treatment, and permitting, during the processing, the freer entry of the solution into the cell walls and interstices. The aluminum sulfate, as used in the solution, does not corrode metals, and has no effect on finishes of any class which are applied to the wood. The aluminum sulfate develops sulphuric acid which aids in the cleansing of the wood. The action of aluminum sulfate in the solution is of benefit, in that it disposes of the proteids and coagulates albuminous matters, and it also increases the strength of the wood at its weakest points. The carbohydrates cause shrinkage of the highly sprung cell walls, and the aluminum sulfate hardens the fibres and coagulates the suspended matter, the lighter coagulated matter rising to the surface of the solution and solidifying, while the heavier coagulated matter is precipitated to the bottom of the tank from which it may be readily removed. The aluminum sulfate also aids in preventing the usual caramelizing of the carbohydrates, the alkalies being neutralized, and the dextrose, which is used because of its osmotic properties, does not darken as easily as when the aluminum sulfate is absent. The solution remains clear and bright, excepting as it is colored by dyes or coloring matter removed from the wood.

The object in/or for using glycerine is to increase flexibility and produce smoother, easier working and finishing properties in all species of wood and increase the resistance against mechanical abrasion and wear.

As the best of glycerine is produced from fermentation of sugars and molasses, glycerine also has an affinity for wood and woody growth, thus proving there can be no reaction that will create a condition whereby the treated wood will not remain in a tempered condition.

Having thus described the invention, what is claimed as new is:

1. The method of seasoning, preserving, and tempering wood, which consists in impregnating the wood with an aqueous solution containing invert sugar, glycerin, aluminum sulphate, and anhydrous dextrose.

2. A preservative solution for impregnating wood consisting of water having in solution invert sugar in an amount approximately one fifth of the amount of water, glycerin approximately one twentieth the amount of water, anhydrous dextrose approximately one twentieth the amount of water, and aluminum sulphate approximately one two hundredth of the amount of water.

GEORGE ELTON RICE.